UNITED STATES PATENT OFFICE.

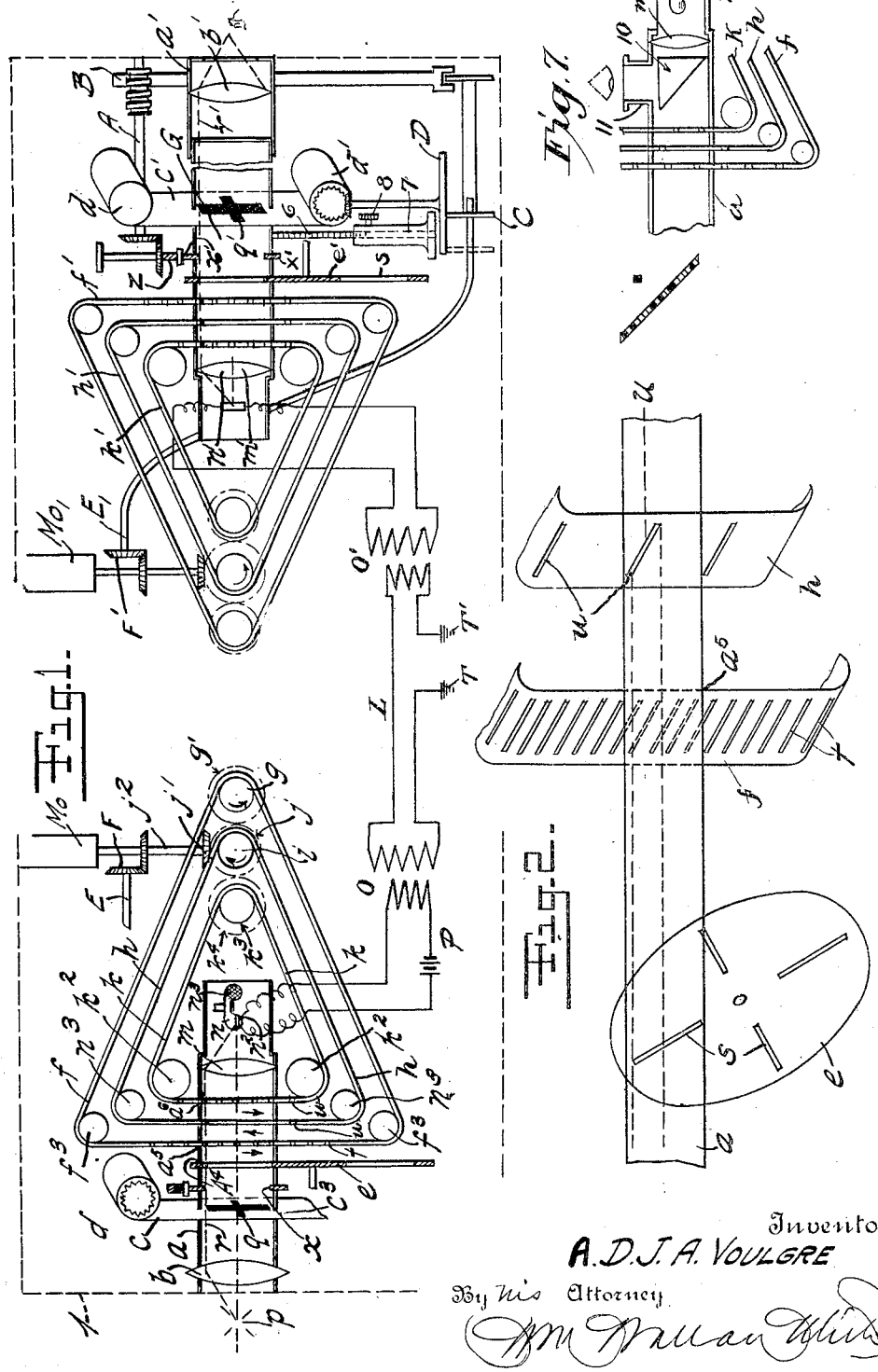

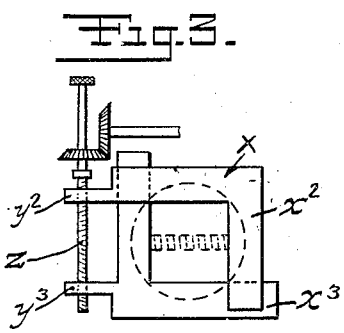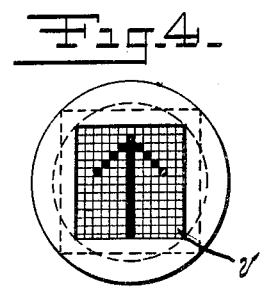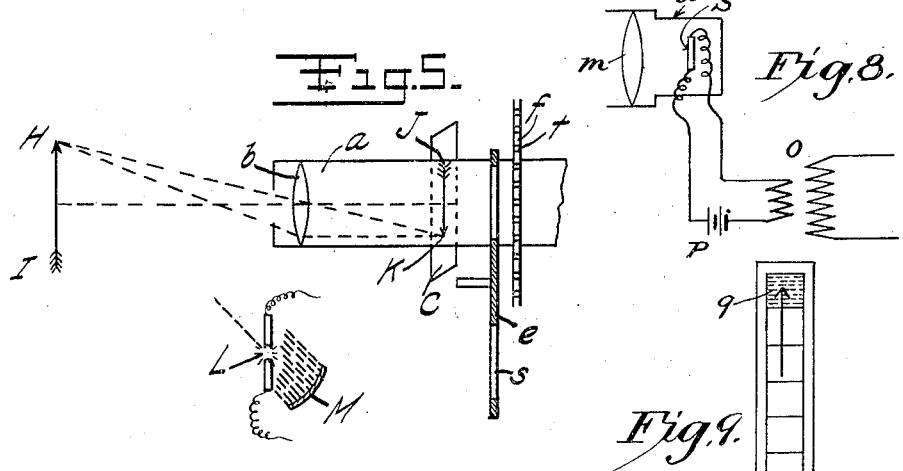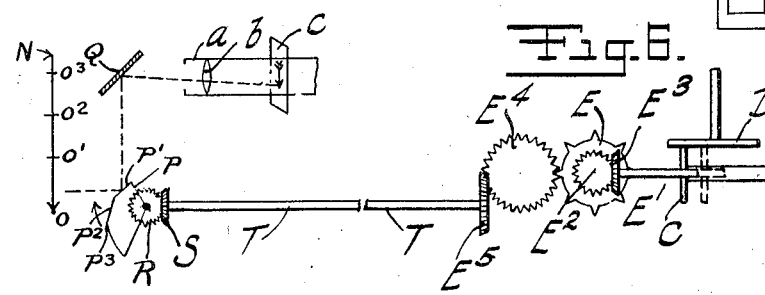

ANDRÉ DENIS JOSEPH ANTOINE VOULGRE, OF BAYONNE, FRANCE.

TELEVISION AND TELEPHOTOGRAPHIC APPARATUS.

1,329,688.  Specification of Letters Patent.  Patented Feb. 3, 1920.

Application filed April 1, 1916. Serial No. 88,253.

*To all whom it may concern:*

Be it known that I, ANDRÉ DENIS JOSEPH ANTOINE VOULGRE, a citizen of the Republic of France, residing at Villa Toki-Ona, Bayonne, France, have invented new and useful Improvements in Television and Telephotographic Apparatus, of which the following is a specification.

My invention relates to television and telephotographic apparatus.

The object of the invention is to provide an apparatus for the transmission of luminous impressions, to permit either the viewing or the photographing of images and objects at remote distances.

The invention is based upon the following principles: first, the division of the image occupying the field of view into a plurality of parts; second, the successive transmission of luminous impressions emitted by each of them; third, their perception one after the other by the eye, or by the receiving apparatus, for a duration of time that the last one is inscribed before the first impression has disappeared; fourth, the repetition of this same operation a certain number of times, for the same surface under operation, in a way that the successive impressions of each one of the parts is persistent enough for it to be perceived or registered by the receiving apparatus.

My invention consists of the construction, combination and arrangement of parts, as herein illustrated, described and claimed.

In the accompanying drawings forming part hereof, I have illustrated a form of embodiment of my invention in which drawings similar reference characters designate corresponding parts, and in which:

Figure 1 is a side elevation, the transmitting and receiving elements being shown in relative position;

Fig. 2 is a fragmentary detail in perspective, showing the arrangement of the tube and screens;

Fig. 3 is a fragmentary detail in elevation of a diaphragm;

Fig. 4 is an elevation, showing the manner of division of the field of the lenses of the apparatus;

Fig. 5 is a side elevation showing the means for throwing an intense light on the object to be transmitted;

Fig. 6 is a diagrammatic view of a rotatable mirror arrangement for use in reproducing objects having a considerable area;

Fig. 7 is a detail of a modification including a light chamber at the transmitting station;

Fig. 8 is a detail of a modification including a selenium cell; and

Fig. 9 is a diagrammatical view showing how several partial images may be juxtaposed in the projection to form a complete image.

The transmitting apparatus, Fig. 1, consists of a tube $a$, hermetically closed at its rear end. Mounted in the front end of the tube $a$ is a double convex lens $b$. A transparent image carrying band $c$, is disposed through a transverse slot $c^3$ in the tube $a$ so that it may be rolled up on a cylinder $d$, rotatably supported on a suitable casing 1.

An opaque disk $e$, is rotatably supported adjacent the tube $a$ so as to extend through a transverse slot $A^4$, and is provided with radial slots $s$. The disk $e$ is arranged so that its shaft is below the tube $a$, so that rotation of the disk as hereinafter described brings the slots $s$ successively into register with the tube and lens $b$.

An opaque band $f$ is disposed over idlers $f^3$, carried by the casing 1 and arranged to pass through a transverse slot $a^5$ in the tube $a$, and provided with a plurality of transverse parallel slots $t$ arranged close to each other and regularly spaced. The band $f$ is arranged around and to be actuated by a cylinder $g$, driven by a gear $g'$ meshing with a gear $j$ as hereinafter described, so that its slots $t$ register with the lens $b$ and tube $a$.

A second opaque screen band $h$ is arranged over idlers $n^3$, but being moved in a direction the reverse of the band $f$, is provided with slots $u$ separated in such a fashion that the slots pass successively into the field of the eye piece, but in such a manner that only one slot is in the field at the same time. The spacing of the two consecutive slots is, in addition, equal to the diameter of the eye piece. The band $h$ is arranged around and is actuated by a cylinder $i$, formed integrally with the gear $j$, arranged to be driven by pinion $j'$ on the shaft $j^2$ of a suitable motor $Mo$.

A third band screen $k$, absolutely similar to the screen $f$, and turning in the same direction is disposed over idlers $k^2$ and a cylinder $k^3$ on which is a gear $k^4$ disposed in mesh with the gear $j$. The band $k$ passes through a slot $a^6$ in the tube $a$ and is provided with transverse slots $w$.

The cylinders $i$, $k^3$ and $g$, are driven by the gear $j$ actuated by the motor Mo, and the respective dimensions of the screens and of the cylinders for unrolling the same are such that the speed of unrolling of each of the screens, $f$, $h$ and $k$, is identical, the three above mentioned gears $g^1$, $j$ and $k^4$ having the same diameter.

A double convex lens $m$ is disposed in the tube $a$ and in its focal center is disposed a glass or crystal bulb $n$, in which vacuum has been made and containing an amalgam of sodium and rubidium. This bulb has in its lower part two electrodes $n^2$, one of which, the negative electrode, is so placed as to contact with the amalgam when the bulb is in a horizontal position, the other electrode, or positive electrode, extending into the bulb above the amalgam. The contact is broken when the tube $a$ is raised to a vertical position so that the amalgam may pass into a second darkened bulb $n^3$, connected with the bulb $n$. The function of the darkened bulb $n^3$ is to protect the amalgam from the action of the light when the apparatus is to be left out of operation for a long period. The positive electrode is connected with the positive pole of a supply of electricity, P, and the negative with one terminal of the primary circuit of an induction coil or transformer $o$, the other terminal of which is connected to the negative pole of the source P.

The secondary circuit of the induction coil $o$ has one of its terminals connected to the ground T at the transmitting station and its opposite terminal is connected through the line wire L to the receiving station.

The receiving element consists of parts identical with the parts described as constituting the transmitting element.

A tube $a'$ forming an eye piece; a magnifying lens $b'$ disposed in the tube; an image carrying band $c'$, moved by a cylinder $d'$; an opaque disk $e'$, having radial slots $s$, two band screens $f'$ and $k'$, both alike and turning in the same direction and provided with slots; a band screen $h'$, with slots farther apart, of which a single one at a time comes into the field of the eye piece, and being moved in a direction opposite to the screen $f'$ and $k'$; a motor Mo' controlling them with a constant speed; a double convex lens $m'$, whose principal focus is occupied by a lamp $n'$, of mercury vapor, which is fed by the secondary current of a coil $o'$, of which the primary circuit is connected to the secondary circuit of the transmitting apparatus. One terminal of said primary circuit is connected to the line wire L, the other goes to the ground T' at the receiving station.

For limiting the effective area of the images transmitted, two diaphragms or shutters are arranged as shown at $x$ at the transmitting station and $x'$ at the receiving station.

These diaphragms are composed of two opaque sheets $x^2$, $x^3$ cut off in a square, and each having an interiorly screw threaded extension $y^2$, $y^3$ into which a screw $z$ engages, to permit the regulation at will of the opening of the diaphragm to give to the free space a square or rectangular shape. The screw $z$ extends outside of the casing $l$ and terminates in a knurled disk. The functions and the results are the same for the disk $c'$, the screens $f'$, $h'$, $k'$, and diaphragm $x'$, of the receiver.

In the operation of the invention a source of intense light $p$, being placed in front of and in the principal focus of the lens $b$ of the transmitter, parallel rays are refracted and projected into the interior of the tube $a$. Parallel, they traverse the screen $c$, or do not traverse it, according as this screen bears, or not, a design $q$ (drawn in ink, for example, or in any other fashion—printed text, etc.) making an obstacle to their passage. A ray $r$, traversing this screen at a transparent point of the image to be transmitted strikes the disk $e$, passing through a slot $s$, if this opening is in its path. Under these conditions it continues its course in through the transverse openings $t$, $u$, $w$ and strikes at the lens $m$, which deflects it upon the bulb $n$, which we assume to be in working position, that is to say, in such a way that the amalgam of sodium and of rubidium contained in it places the positive and negative electrodes of the supply P in contact.

In the absence of any light the primary circuit of the coil $o$, operates normally and has no influence, as long as the intensity of the current remains constant, upon the secondary circuit of the same coil, which is closed by the line (wire), L, which extends to the receiving station, the primary circuit of the transformer $o'$ of the receiver (Fig. 1) and the two ground wires T and T' at the transmitting and receiving stations respectively.

The constancy of the currents of P, does not allow of the formation of induction currents in the secondary circuit of transformer $o'$ of the receiver. But on the arrival of the luminous ray $r$ at the bulb, the resistance of the circuit including the amalgam of sodium and rubidium included in the primary circuit of the transformer $o$ is suddenly decreased and the resulting variation in the amount of current flowing through the primary circuit of the transformer $o$ causes a corresponding induced current to flow through the secondary circuit of said transformer. Said induced current acts upon the mercury vapor lamp $n'$, of the receiving apparatus (Fig. 1). The rays engendered by this lamp are refracted parallel to the axis of the eye piece $a'$, by the lens $m'$, and a certain ray $r'$ corresponding to ray $r$ will cross through the screens, $k'$, $h'$, $f'$, and the disk $e'$ and strike the screen $c'$ so as to illuminate it at a point which is the image of the said transparent point of the drawing to be transmitted. If the image is small, it may be observed by the aid of the magnifying lens $b'$.

By replacing the screen $c'$ by a sensitive film, said film will be impressed at a point which will be the photograph of the corresponding transparent point of the drawing to be transmitted.

In order to obtain on the band $c'$ an exact reproduction of the image on the band $c$, it is first necessary that the whole area of the part of the band $c$ which lies within the field of the eye piece $a$ be explored in all of its points and, second, that the paths left free for the luminous rays to pass at each instant through the different screens at the transmitting and receiving stations should occupy at the same instant exactly symmetric positions in the fields. This latter condition is complied with by means of any known arrangement insuring a perfectly synchronous rotation of the different screens at both stations. In particular, the motors, $Mo$, $Mo'$ will be run synchronously and with a constant speed and the space between two consecutive slots $u$ will correspond exactly, in the transmitting and receiving stations, with equal numbers of slots in the screens $f$ and $k$.

As regards the exploration of the whole surface of the image, it will be remarked that every slot $u$ in screen $h$ in its upward movement is met by a certain number of slots $t$ and $w$ in the screens $f$ and $k$, each of the slots $t$ and the corresponding slot $w$ being always located in the same horizontal plane in their downward movement through the field as results from the construction above described. Each time the ascending slot $u$ comes thus opposite one pair of slots $t$ $w$, a free passage is thus offered to the light issuing from a corresponding horizontal area of the image. As the slot $u$ progresses upwardly and is successively met by slots $t$, $w$, corresponding horizontal portions or bands of the image are thus able to be projected and the construction is such that as a slot $u$ leaves the field, the whole image divided into transverse adjacent horizontal bands has thus been able to be projected, the order of succession in the projection of these transverse bands being of course from the bottom to the top of the image, according to the direction of the movement of screen $h$. The purpose in having one slotted screen $h$ rotating in one direction and two slotted screens $f$ $k$ rotating in the opposite direction is to divide the field in a very rapid and efficient manner into a very great number of transverse bands while giving the screens a comparatively small traveling speed.

Now, in the time during which a slot $u$ lies opposite one pair of slots $t$, $w$, $i$, $e$., during the period in which one transverse horizontal band of the image is adapted to be projected, the disk $e$ is rotated by such an angle that one of its slots $s$ entirely sweeps over the field so that the projection of every transverse band is in fact effected by projecting successively the small areas or dots, which successively form the intersection of the said band and the radial slot $s$, the dot $i$. $e$., the point of the image which is projected at any instant, advancing along the line formed by the transverse band as the disk $e$ is rotated.

The whole area of the image is thus divided or reticulated into a considerable number of small points and the flashes of the lamp $n'$ at the receiving station correspond each time to the particular amount of light projected through the corresponding point of the image or in other words to the transparency of said point, the lamp remaining dark if the corresponding point of the image was black since in this case the amalgam in bulb $n$ has not been influenced and no current has been induced in the secondary circuit of the transformer $o'$.

It will be noted that, theoretically, the movement of the slotted bands being continuous, no slits can remain in full register during the time disk $e$ sweeps across the beam. In fact the light beam made by the registering of the parallel slits is slightly wider in height for one position of slit $e$, for instance the vertical position, than for other positions of the same. This has however no disadvantage in practice as only the middle part of the band is comprised in the field of the lens so that the differences in the height of the light beam are so small that they cannot be appreciated by the eye. The light dots transmitted and received during the time a slit $s$ of the $e$ sweeps across the beam will so appear to have the same dimension in height and the "blanks" which might result in the image from the differences in the height of the light beam will be quite imperceptible for the eye, the dimensions of the slits and the speed of the bands being always determined so as to divide up the image into luminous (or obscure) spots so minute and so close to each other that any intervening spaces between the same resulting for instance from any differences in the theoretical area of said spots cannot be perceived by the eye.

The succession of points impressioned or seen on screen $c'$ will thus be the exact reproduction of that of $c$, and, as the same succession will be established for the dark points and for the transparent points of the image $q$, it is the image itself of $q$ that will have made impression on the film $c'$, or which the eye will perceive at its reception on the screen, $c'$.

But these successive impressions will not give to the eye an appearance of simultaneousness, and in consequence, a complete image, unless the speed with which the totality of the field limited by the diaphragm of the eye piece is traversed is great enough to permit the last impression to be made on the receiving eye before the impression made by the first impression has disappeared.

It is possible to obtain this speed by taking account of the following facts: The luminous impression of the last segment ought not be separated from that of the first by more than five one hundredths of a second.

These different luminous impressions will be reproduced in the same order a sufficient number of times in order that the ensemble of those of the same segment may have lasted about three one hundredths of a second. This figure is, besides, variable for each observing retina according to its sensibility.

This result is easy to obtain by taking account on the one hand of the speed of the screen bands $f$ and $k$, and of $h$, the latter of which, moving in a direction opposite to the first two, as well as of the speed of disk $e$, which is jointly proportional to that of the screens, $f$, $k$, $h$ and, on the other hand of the dimensions of the field left free by the diaphragm $x$, $x'$, which may be regulated at will until the image becomes clear on the receiver.

Because of the exceeding minuteness of the sections of the luminous segments necessary to use, the field of the diaphragm is necessarily small. The images transmitted and received will be then very small—some square centimeters of surface—which fact will oblige the transmission of images much reduced in size, or rather small fractions of the same image. An arrangement permits the successive reproduction of the different parts of a design by spacing each one of its parts during a rather short time in order that, as in the cinematograph, the different parts shall follow each other without interruption, as shown in Fig. 9, and give, either the complete design on a receiving photographic plate, or upon the eye of the observer, the impression of a continuous image. This arrangement is controlled by the screw regulation device of the diaphragm $x$, $x'$, which carries a gearing in relation with a shaft, A, which, through the intermediary of a screw, causes a guide, B, to advance, to the right or to the left, in a way to move a disk, C, far or near from the center of another disk, D, which controls the unwinding of the receiving film, $c'$, on the receiver, or of the screen which carries the design, $c$, on the transmitter. This disk, C, is borne by a shaft E, (E′ on the receiver) rotated by one of the motors, M$o$, M$o'$, by means of one of the gearings F F′. Each of the said gearings which are shown diagrammatically in the drawing is so arranged that the shafts E, E′ rotate by a certain angle whenever a certain number of adjacent slots $u$ (for example, ten) have traversed the field of the eye piece.

This number of times (ten for example) is that which, multiplied by the duration of the impression of a pencil of light, gives a total duration equal to that necessary for the eye to experience a luminous sensation. This duration is variable for each observer, but is ordinarily of from two to three one hundredths of a second.

Otherwise expressed, there are as many times of repetition of the image on the field of the eye piece as the number of times the slot $u$ passes into the field of the eye piece, and, this repetition number being fixed, for example at ten, whenever ten successive slots $u$ will have traversed the field, the gearings F, F′ will cause the shafts E, E′ to advance one step.

In addition, this intermittent rotation of the shaft E, E′, and of the disks C at the transmitting and receiving stations will effect the rotation of the disks D, in a variable degree, according as rollers C will have been brought more or less contiguous to the center of the disks, D, by adjusting the regulating screws $z$ of the diaphragms $x$, $x'$ so that the unwinding of the image carrying bands $c$, $c'$ which is thus effected intermittently, will have each time the proper extent corresponding to the actual opening of the diaphragms $x$, $x'$. The desired result is obtained when the successive partial images sent appear to the receiving operator as a normal and uninterrupted image.

It must be noted that the control of the diaphragm in the transmitter has for effect only to increase or retard the rapidity of the succession of the partial images to accord with the minute surface of these partial images. The greater the speed of the motors, the shorter the time that runs beween the passage of two successive slots $u$ across the field and the smaller the partial image of a transmitted image. The diaphragm space should then be smaller in order to take it in and prevent two partial images from overlapping. The observer, by the aid of the screw $z$ will then reduce the opening of the diaphragm, and this operation will also make the partial images on the transmitter or the partial receiving zones of the receiving film appear more rapidly.

The speed of the motors determines the cross sectional area of the light pencils, then, in consequence, the fineness of the design sent or received. The dimension of the diaphragm determines the area of the partial design, and the speed of succession of these partial images that are to be thrown together to form a complete image $q$ as shown in Fig. 9.

An important condition to be observed in operation is that the position of the first luminous ray be the same in two elements (transmitter and receiver). This is secured by causing the situation of the receiving eye piece to vary parallel in its vertical plane and in regard to the band screens. To this end the eye piece $a'$ may be carried by a rack 6 which is guided vertically in a support 7 and may be raised or lowered by means of a pinion mounted in the support and actuated by a knob 8. By this means a slot ($u'$) of the screen $h'$ may be caused to enter the field a little sooner or later according to the requirements. In addition, the diaphragm $x'$, may be adjusted to properly frame the very simple image (cross or arrow as illustrated) sent as a test, and adjust the speed of succession of the partial images and also the extent of the intermittent advancing movement of the sensitive film used, or the image carrying band of the transmitting element of the apparatus.

By replacing in the transmitting part the lens $m$, and the bulb $n$, by the lens $m'$, and the image carrying band $c'$, the image transmitted can be immediately visualized at the transmitting station. This result may be obtained without substitution of any sort by inserting between the screen $k$, and the lens $m$, a light chamber, disposed perpendicularly to the axis of a tube $a$ and by means of which a duplicate of the rays issuing from the image to be transmitted may be observed. Such an arrangement is shown diagrammatically in Fig. 7, in which 10 indicates the prism of the light chamber. 11 is an eye piece mounted on the tube $a$, through which the duplicate image reflected by the prism is observed.

At the transmitting station may also be placed a receiving apparatus actuated either by rays coming through the light chamber, or through a branch line connected to the secondary circuit of the coil $o$.

The apparatus, then, is capable of transmitting the image of a printed or written telegram, or the contour of an object in a way to render this image visible to the eye of an observer at the receiving station, or susceptible of being received by a sensitive plate at the same station and to obtain its photograph.

In order to send a non-transparent object, an arrangement slightly different may be used (Fig. 5). The object, H I, is placed without the local plane of the lens $b$, which acts as the objective of a photographic apparatus, and the image is reproduced at the back of a dark chamber in J K on the screen $c$ inside of the tube $a$. This real and reversed image is sent, as has been said before, for the image $q$, Fig. 1. In this case the eye piece $a$, may be provided at its rear part with a slide permitting to focus the image of the object, H I, on the plate $c$, the same as for an ordinary photographic apparatus.

In order to give greater clearness to the image of the object, we light this latter by means of a supply of intense light, L', (an electric arc light for example) whose rays are reflected by a mirror, M, upon the object, H I. The object may be the visage of a person, who may be seen or photographed directly at the receiving spot.

If the object is too considerable for a reduction to the dimension of the field of the eye piece to be practically utilized (as a landscape, for example), the arrangement (Fig. 6) permitting its reproduction in a series of partial images is used.

This arrangement comprises a rotatably mounted mirror P having a plurality of reflecting surfaces P', $P^2$, $P^3$, $P^4$ located at different distances from the axis of rotation of the mirror and suitably inclined. By means of this arrangement, the part OO' of the object or image to be transmitted is reflected by the surface P' on to a reflecting plane Q which acts to reflect it into the objective formed by the tube $a$ and give the image on the image carrying band or screen $c$ as described with respect to Fig. 5. From this screen, the image is transmitted as in the apparatus of Fig. 5. The mirror P is then rotated one step, whereby its reflecting plane $P^2$ comes into play and takes such a position, as to project on to the mirror Q the next part O' $O^2$ of the image. The mirror P being further rotated later on, the part $O^2$ $O^3$ of the image will be reflected on to the mirror Q by the reflecting face $P^3$ of the mirror P and so on so that the different parts of the image or object are thus transmitted without said object or image having to be moved. The mirror P may be suitably and intermittently rotated by the motor by means of a gearing such as diagrammatically shown in Fig. 6. If each of the partial images such as O' $O^2$ is to be transmitted ten times as explained above, the mirror P will of course be stationary during the whole time necessary for ten successive slots $u$ of the screen $h$ to traverse the field of the eye piece, then the mirror will be rotated one step so as to reflect the next part of the image or object and so on.

The mirror P may in this way break up the image O N into many partial images, which will permit, on their reception, the view of several images in juxtaposition with each other cinematographically, or being reproduced photographically under the same conditions.

Also, the variations of intensity in the circuit of the battery P may be obtained by means of a selenium cell S substituted for the bulb n as shown diagrammatically in Fig. 8. The bulb n may also contain, in the first arrangement described any one of the potassium, sodium or rubidium amalgams.

Having thus described my invention what I claim and desire to secure by Letters-Patent of the United States is:

1. The herein described apparatus comprising a transmitting element having means for breaking up the rays from an image into a plurality of pencils of light and an energizing means containing a composition of rubidium and another metal, a receiving element, and an electrical connection between the energizing means and the receiving element.

2. The herein described apparatus comprising a transmitting element having means for breaking up the rays from an image, a container having two connected parts one of which is darkened, disposed in the path of the rays and a composition in the container capable of electro-actinic activity, a receiving element, and an electrical connection from one of the parts of the container, which is not darkened, to the receiving element.

3. The herein described apparatus comprising the combination of a pair of lenses, means for breaking up the rays of light between the lenses, a two part shutter disposed between the lenses, means for adjusting the shutter, an electro-actinic energizing element disposed in the path of the rays, a receiving element, and an electrical connection from the energizing element to the receiving element.

4. The herein described apparatus comprising the combination of a pair of lenses, means for breaking up the rays of light between the lenses, a two part shutter disposed between the lenses having interiorly screw threaded extensions, a screw threaded member disposed through the extensions, an electro-actinic energizing element disposed in the path of the rays, a receiving element, and an electrical connection from the energizing element to the receiving element.

5. The herein described apparatus comprising the combination of a pair of lenses, means for breaking up the rays of light between the lenses, means for limiting the field of the rays of the light, a screen interposed in the field, means for moving the screen at a speed proportionate to the field of the rays, an electro-actinic energizing element disposed in the path of the rays, a receiving element, and an electrical connection from the energizing element to the receiving element.

6. The herein described apparatus comprising the combination of a pair of lenses, means for breaking up the rays of light between the lenses, a shutter disposed in the path of the rays and provided with interiorly screw-threaded extensions, a screw-threaded member disposed through the extensions, a shaft arranged to be rotated by the screw-threaded member, a disk arranged to be moved by rotation of the shaft, means for driving the disk, a screen interposed between the lenses, a support for the screen, means for driving the support by rotation of the disk at a speed proportioned to the position of the disk, an electro actinic energizing element disposed in the path of the rays, a receiving element, and an electrical connection from the energizing element to the receiving element.

7. The herein described apparatus comprising a pair of lenses, an energizing element disposed adjacent one of the lenses, a plurality of movable screens provided with openings disposed between lenses, means for moving the screens synchronously, a receiving element, and an electrical connection.

8. The herein described apparatus comprising a pair of lenses, an energizing element disposed adjacent one of the lenses, a plurality of oppositely movable screens provided with openings disposed between lenses, a rotatable disk provided with radial slots disposed between the lenses, means for rotating the disk, means for moving the screens synchronously, a receiving element, and an electrical connection.

9. The herein described apparatus comprising a pair of lenses, an energizing element disposed adjacent one of the lenses, an image carrying band disposed adjacent the other lens, two slotted members, means for moving said members so that the point of intersection of a slot in one member and a slot in the other member is displaced in projection, all over the image, a receiving element and an electrical connection.

10. The herein described apparatus comprising a pair of lenses, an energizing element disposed adjacent one of the lenses, an image carrying band disposed adjacent the other lens, a transversely slotted screen and a rotatable disk provided with radial slots disposed between the lenses, means for rotating the disk, means for moving the transversely slotted screen, a receiving element and an electrical connection.

11. The herein described apparatus comprising the combination of a pair of lenses, means for breaking up the rays of light between the lenses, a shutter disposed between the lenses for limiting the field of the rays of light, means for adjusting said shutter, an energizing element disposed adjacent one of the lenses, an image carrying band disposed adjacent the other lens, a mechanism for moving said band, an operative connection between the means for adjusting the shutter and the mechanism for moving the band, a receiving element and an electrical connection from the energizing element to the receiving element.

12. The herein described apparatus comprising a transmitting element embodying a mechanism for breaking up the rays from an image into a plurality of pencils of light, a shutter for limiting the field of the rays of the light, a motor adapted to drive the breaking up mechanism, adjusting means for the shutter, said adjusting means being in relation with the said driving connections so as to vary the speed of the breaking up mechanism according to the opening of the shutter, an energizing means, a receiving element and an electrical connection between the energizing means and the receiving element.

13. The herein described apparatus comprising a transmitting element having means for breaking up the rays from an image into a plurality of pencils of light and an energizing means, a receiving element and an electrical connection between the energizing means and the receiving element said receiving element embodying a breaking up mechanism for the image, a shutter for limiting the field of the image and means whereby the breaking up mechanism and the shutter may be adjusted relatively to each other.

14. The herein described apparatus comprising a transmitting element having means for breaking up the rays from an image into a plurality of pencils of light, an image carrying band adjacent said breaking up means, means for successively projecting on to said image carrying band the image of adjacent portions of a stationary object, said means embodying a rotatable reflecting means having suitably inclined reflecting surfaces, means for intermittently rotating said reflecting means, a stationary mirror and a lens, an energizing means, a receiving element and an electrical connection between the energizing means and the receiving element.

15. The herein described apparatus comprising a transmitting element embodying a mechanism for breaking up the rays from an image into a plurality of pencils of light, an image carrying band adjacent said breaking up mechanism, said band carrying a number of adjacent images, means for driving said mechanism and moving the image carrying band whereby the individual images on the band are each successively broken up and transmitted a plurality of times before transmitting the next succeeding image, energizing means, a receiving element and an electrical connection between the energizing means and the receiving element.

In testimony whereof I have signed my name to this specification.

ANDRÉ DENIS JOSEPH ANTOINE VOULGRE.